(12) United States Patent
Ondracek

(10) Patent No.: US 9,226,617 B1
(45) Date of Patent: Jan. 5, 2016

(54) BOTTLE WITH HEATED SPOUT

(71) Applicant: John Ondracek, Denver, CO (US)

(72) Inventor: John Ondracek, Denver, CO (US)

( * ) Notice: Subject to any disclaimer, the term of this patent is extended or adjusted under 35 U.S.C. 154(b) by 0 days.

(21) Appl. No.: 14/625,736

(22) Filed: Feb. 19, 2015

(51) Int. Cl.
*A47J 41/00* (2006.01)
*B65D 23/10* (2006.01)
*B65D 25/48* (2006.01)
*H05B 3/18* (2006.01)
*A47J 31/46* (2006.01)
*A47J 31/10* (2006.01)

(52) U.S. Cl.
CPC .............. *A47J 41/005* (2013.01); *B65D 23/10* (2013.01); *B65D 25/48* (2013.01); *H05B 3/18* (2013.01); *A47J 31/10* (2013.01); *A47J 31/46* (2013.01)

(58) Field of Classification Search
CPC ...... B65D 23/10; B65D 25/48; B67D 1/0081; B67D 1/0897; B67D 1/02; H05B 3/18; A47J 31/005; A47J 31/46; A47J 31/10; A47J 47/01; A47J 47/00; A47J 41/00
See application file for complete search history.

(56) References Cited

U.S. PATENT DOCUMENTS

| | | | |
|---|---|---|---|
| 4,544,085 A | 10/1985 | Frazer | |
| 4,549,051 A * | 10/1985 | Ness | A61M 5/44 219/630 |
| 4,941,597 A | 7/1990 | Lopez | |
| 5,040,700 A | 8/1991 | Compton | |
| 5,221,050 A * | 6/1993 | Jeffries | B05B 5/035 222/103 |
| 5,280,847 A | 1/1994 | Blum | |
| 6,283,656 B1 * | 9/2001 | Jiang | B60S 3/047 15/103 |
| 6,315,153 B1 * | 11/2001 | Osborn | A47G 23/0216 220/737 |
| 6,425,496 B1 * | 7/2002 | Schulein | G09F 23/00 116/200 |
| 6,460,735 B1 * | 10/2002 | Greenwald | A47J 31/50 222/145.5 |
| 6,891,130 B2 * | 5/2005 | Evanyk | B05C 17/0053 219/240 |
| 8,319,654 B2 * | 11/2012 | Field | A47L 13/26 204/194 |
| 8,424,713 B2 * | 4/2013 | Bolland | A47G 23/0266 141/329 |
| 8,618,448 B2 * | 12/2013 | Alexander | A47G 19/2288 165/58 |
| 8,658,944 B2 * | 2/2014 | Clemenz | F23L 13/00 219/213 |
| 2004/0206745 A1 | 10/2004 | Eberhard | |
| 2007/0045276 A1 * | 3/2007 | Fisher | F23Q 7/16 219/268 |

FOREIGN PATENT DOCUMENTS

| | | |
|---|---|---|
| CN | 2075052 U | 4/1991 |
| CN | 2889109 Y | 4/2007 |
| CN | 103356059 A | 10/2013 |
| CN | 103431757 A | 12/2013 |
| EP | 1609400 | 12/2013 |
| FR | 600068 A | 1/1926 |
| KR | 1020050043234 | 5/2005 |
| KR | 200259828 Y1 | 12/2012 |

* cited by examiner

*Primary Examiner* — Frederick C Nicolas
(74) *Attorney, Agent, or Firm* — Leyendecker & Lemire LLC

(57) ABSTRACT

A bottle assembly is described having a battery-powered heated elongated spout. A heater embedded along the length of the spout is typically activated by a switch provided on the assembly. A LED indicator is also typically provided to indicate when the heater is activated. The LED can also function as a battery level indicator that changes color when the battery packs level of charge is depleted to a predetermined level. A charging port is provided through which the battery pack can be recharged using a suitable charger.

19 Claims, 3 Drawing Sheets

BOTTLE WITH HEATED SPOUT

BACKGROUND

Traditionally, to maintain a beverage at an elevated temperature, an insulated bottle or container is used. The insulation often comprises an evacuated space maintained between the inner and outer shells of the bottle to slow heat transfer but not eliminate it. Accordingly, over time and depending on the surround ambient conditions, the beverage contained in the bottle cools. Essentially, the effective use time of the insulated bottle is limited to several hours before the liquid contents cool to a temperature below a desired minimum.

Actively heated bottles and containers are known but the amount of energy required to heat the liquid contents and maintain the liquid at a desired temperature is significant. Typically, these types of container are used with insulation and employ AC electric heaters that need to be plugged into an outlet to operate. Using batteries to power the heater is just not practicable given the size and weight of the battery or batteries required to heat and maintain the liquids temperature for any reasonable period of time.

DETAILED DESCRIPTION

Figure 1:
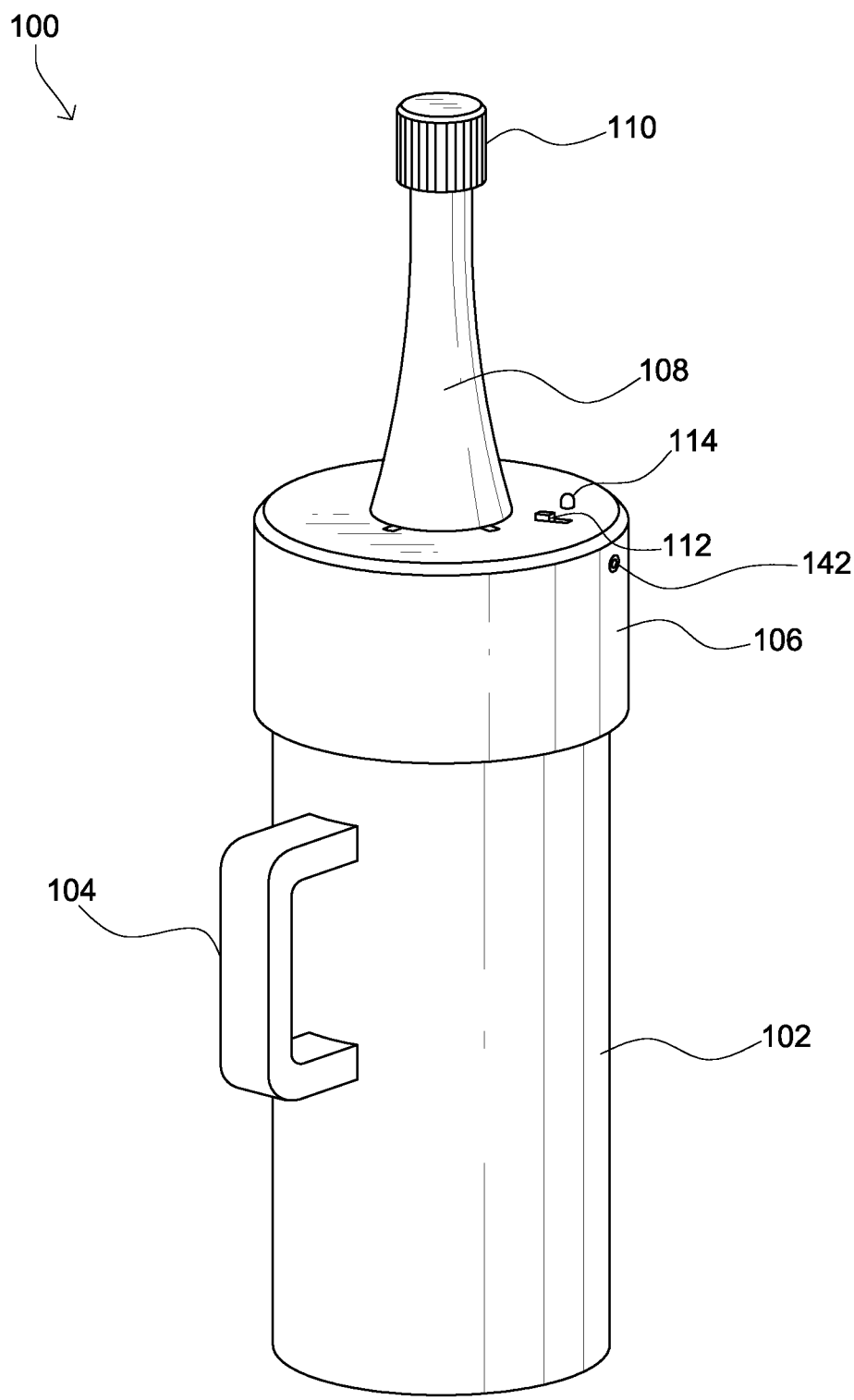
FIG. 1 is an isometric view of a bottle assembly with a heated spout according to one embodiment of the present invention.

Embodiments of the present invention comprise a bottle assembly having a battery-powered heated elongated spout. Advantageously, the liquid is heated only as it flows through the spout eliminating the need to heat and maintain the contents of the bottle at a certain elevated temperature before the beverage is desired. A heater embedded along the length of the spout is typically activated by a switch provided on the assembly. A LED indicator is also typically provided to indicate when the heater is activated. The LED can also function as a battery level indicator that changes color when the battery pack's level of charge is depleted to a predetermined level. A charging port is provided through which the battery pack can be recharged using a suitable recharger, which is most often configured to be plugged into an AC socket.

Terminology

The terms and phrases as indicated in quotes (" ") in this section are intended to have the meaning ascribed to them in this Terminology section applied to them throughout this document including the claims unless clearly indicated otherwise in context. Further, as applicable, the stated definitions are to apply, regardless of the word or phrase's case, to the singular and plural variations of the defined word or phrase.

The term "or" as used in this specification and the appended claims is not meant to be exclusive rather the term is inclusive meaning "either or both".

References in the specification to "one embodiment", "an embodiment", "a preferred embodiment", "an alternative embodiment" and similar phrases mean that a particular feature, structure, or characteristic described in connection with the embodiment is included in at least an embodiment of the invention. The appearances of the phrase "in one embodiment" in various places in the specification are not necessarily all meant to refer to the same embodiment.

The term "couple" or "coupled" as used in this specification and the appended claims refers to either an indirect or direct connection between the identified elements, components or objects. Often the manner of the coupling will be related specifically to the manner in which the two coupled elements interact.

Directional and/or relationary terms such as, but not limited to, left, right, nadir, apex, top, bottom, upper, lower, vertical, horizontal, back, front and lateral are relative to each other and are dependent on the specific orientation of an applicable element or article, and are used accordingly to aid in the description of the various embodiments and are not necessarily intended to be construed as limiting.

An Embodiment of a Bottle Assembly Having a Heated Spout

An embodiment of a bottle assembly 100 having a heated spout and its components are illustrated in FIGS. 1-4. The illustrated embodiment comprises (i) a bottle 102, (ii) a heated spout 108 including an end cap 110, and (iii) a battery pack assembly 106. The various components and assemblies are integrated into a single easily transportable unit that can deliver a heated beverage through the spout on demand.

The bottle 102 can be of any suitable configuration or size and made from any suitable material. Most typically, the bottle has a single wall and is comprised of a plastic material, although other suitable materials or combinations of materials can be used. In variations, the bottle can be double walled and insulated. The liquid capacity of the bottle depends on the particular variation but capacities of 12-32 ounces are most typical. As illustrated, the bottle includes a handle 104 and a threaded opening 103 on which the heated spout 108 is received and secured.

Figure 2:
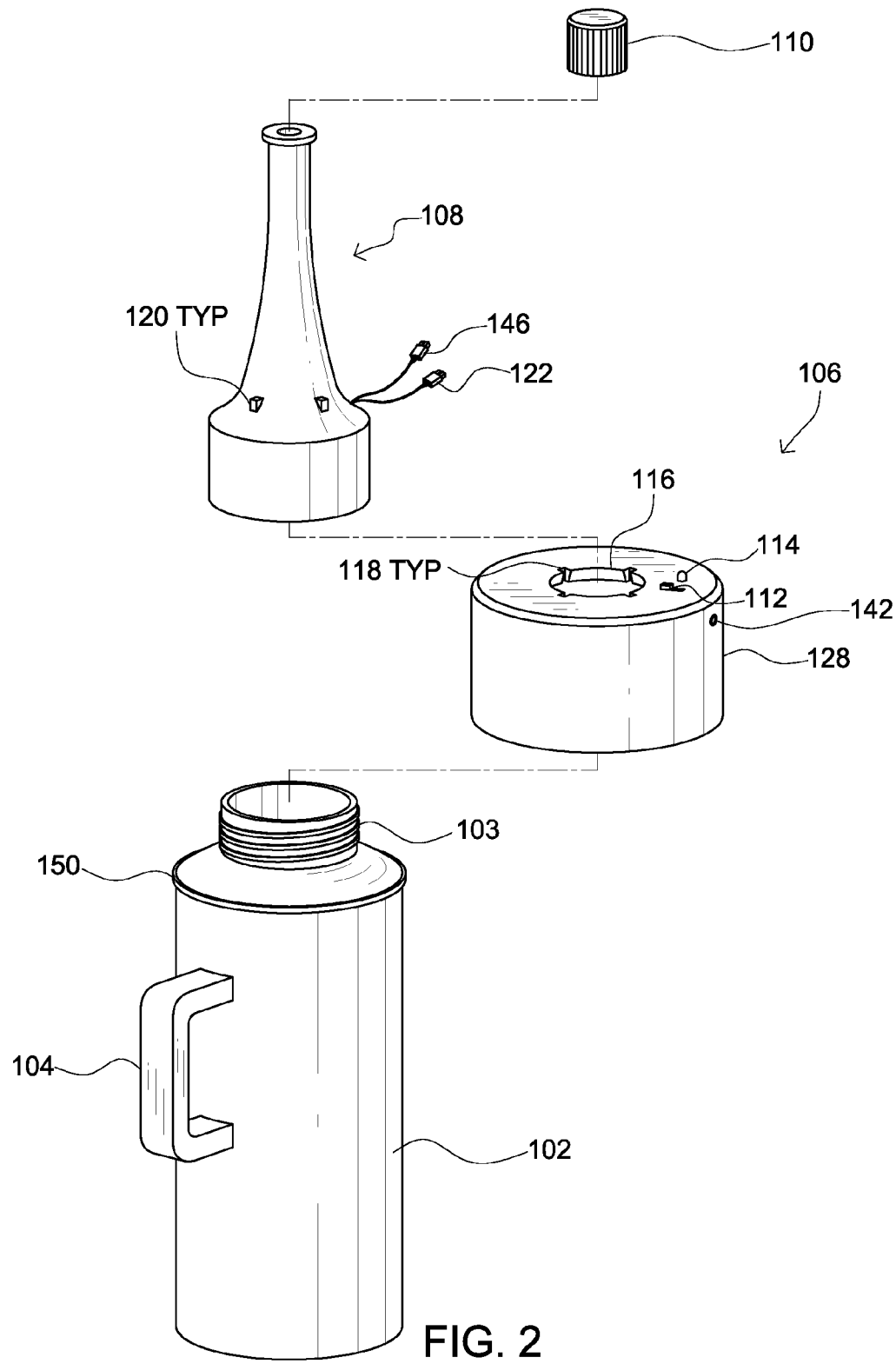
FIG. 2 is an isometric partial exploded view of the bottle assembly with a heated spout according to one embodiment of the present invention.
Figure 3:
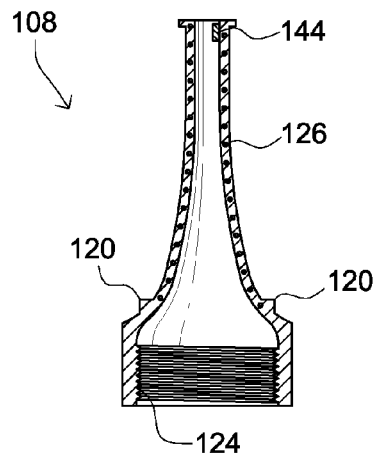
FIG. 3 is cross sectional view of the spout according to one embodiment of the present invention.

The heated spout is best shown in the exploded view of FIG. 2 and the cross sectional view of FIG. 3. Like the bottle, the spout is typically comprised primarily of a plastic material. The spout is elongated and has a length much greater than prior art unheated beverage bottles. As shown the spout is also tapered having a generally frustoconical shape over a portion thereof both on the exterior and more significantly along its interior passageway as is best seen in FIG. 3. The elongated nature of the spout combined with the tapering are provided to increase the heated surface area over which liquid will pass as it is poured out of the bottle 102. The passageway is typically at least 2" long, more preferably at least 2.5" long and most preferably at least 3" long.

A electric resistance heater 126 usually in the form of a coiled small diameter wire is molded into and encapsulated by the spout during the spout's fabrication. Additionally, on some embodiments, a temperature sensor 144 is also provided near the distal end of the spout. As shown, a first heater connector 122 and a first temperature sensor connector 146 both attached to wires extending out of the spout from the respective heater and temperature sensor 144 are provided near the proximal end of the spout. The connectors are configured to couple with mating second heater and temperature connectors 134 & 148 respectively of the battery pack assembly 106. Through the heater connectors power is provided to the heater from the battery pack 138. Through the temperature sensor connectors a signal is provided to the circuit board controller pertaining to the temperature of the liquid as is exits the spout.

In variations of the spout, the heater can comprise a distinct unit instead of being molded into with the rest of the spout.

For instance, a heater unit can be inserted inside the spout with one or more attachment features being provided in the remainder of the spout to secure the heater unit in place. Further, the heating elements of the heater need not be located only against the surface of the spout's passage. For instance, in some variations the resistance wire can span and crisscross from one side of the spout's passage to the other; thereby, requiring the liquid beverage to flow over it when being poured from the bottle. As would be obvious to one or ordinary skill given the benefit of this disclosure, there are a significant number of variations and configurations of the heater and how it is incorporated into the spout.

On the distal end of the spout an end cap 110 is provided to seal the spout and ensure against the spillage of a beverage in the bottle therefrom. The spout can be of the snap-on type as illustrated or the cap and the end of the spout 108 may be complimentarily threaded. The spout is typically fabricated from plastic but other suitable materials such as a metal may be used.

Located near the proximal end of the spout above the threaded portion 124, four keys 120 (or protrusions) extend radially outwardly from the spout at 90 degree angles relative to each other. These keys are adapted to hold the shroud 128 of the battery pack assembly 106 in place by being received in corresponding keyways 118 therein and prevent the shroud from rotating when received on the bottle and over the spout.

Figure 4:
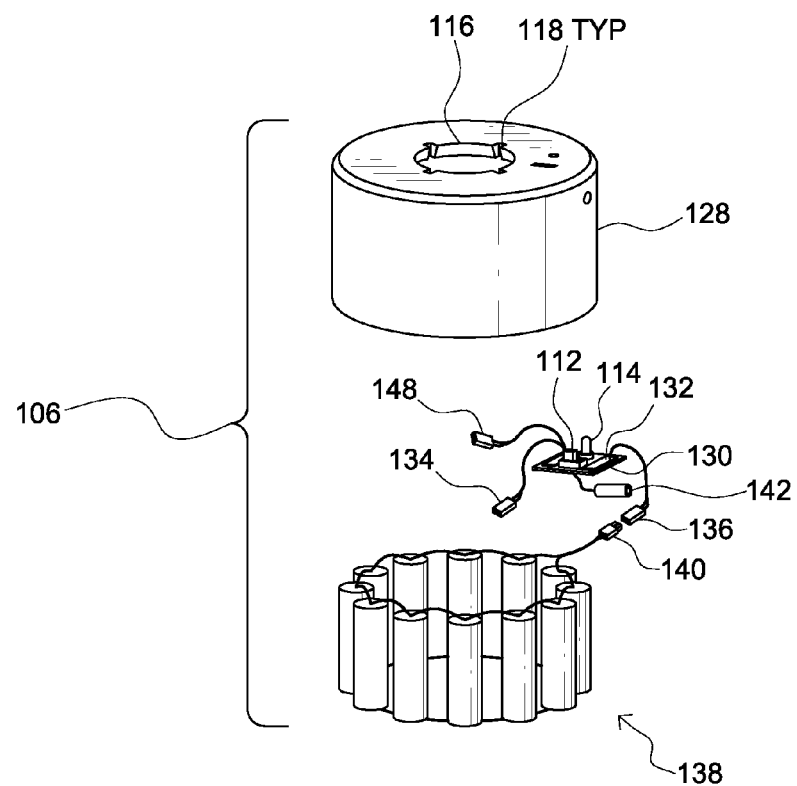
FIG. 4 is an isometric exploded view of the battery pack assembly according to one embodiment of the present invention.

The battery pack assembly 106 is illustrated in its assembled configuration in FIG. 2 and in an exploded view in FIG. 4. The battery pack assembly comprises (i) battery pack 138 wired together and including a first batter pack connector 140, (ii) a circuit board 130 (also referred to as a control circuit) including a controller chip 132, an LED lamp 114, an on/off switch 112, a second battery pack connector 136, a second heater connector 134, a second temperature sensor connector 148 and a charging port 142, and (iii) a battery pack shroud 128 (or cover).

In its assembled form the shroud 128 with the battery pack 138 and circuit board 130 contained therein is received over the spout through a spout opening 116 with the keys 120 of the spout being received in corresponding keyways 118 extending from the opening. Additional openings or cutouts are provided through the top surface of the shroud for the on/off switch 112 and the LED lamp 114. A charging port opening is provided on the side of the shroud to provide access to the charging port 142. The shroud is typically comprised of plastic and includes a ridge or lip (not shown) that extends circumferentially around the inside of the bottom lip and mates with a corresponding lip 150 extending around the top of the bottle 102 to secure the battery pack assembly 106 in place.

The type of batteries contained in the battery pack 138 can vary but are typically NiMH, NiCAD or Li-ion type rechargeable cells. FIG. 4 shows 12 AA or AAA size cells wired together; however, the number and size can vary depending on the size of the bottle 102 and consequently the space available in the shroud. The cells may be wired in series, parallel or a combination thereof to provide the optimum voltage to the heater 126 depending on its specific design. The battery pack is coupled to the circuit board 130 by way joining the battery pack and second circuit board connectors 136 & 140.

The circuit board includes an on/off switch to permit or prevent the flow of current from the battery pack to the heater 126. A controller chip is also provided to monitor and control the electronic functions of the bottle assembly 100 including recharging, current flow during the heating operation and battery charge level monitoring. For instance, when the bottle assembly is equipped with the temperature sensor 144, the controller will turn the heater off and on to ensure the temperature of the liquid leaving the spout does not exceed a predetermined temperature. The controller is operatively coupled to the LED lamp 114, which is illuminated when the heater is activated. The controller may also be configured to cause the lamp to flash or change color to indicate to the bottle's user the state of charge of the battery pack 138. The circuit board is coupled to the heater by joining the heater and first circuit board connectors 134 & 122.

Variations and Other Embodiments

The various embodiments and variations thereof, illustrated in the accompanying Figures and/or described above, are merely exemplary and are not meant to limit the scope of the invention. It is to be appreciated that numerous other variations of the invention have been contemplated, as would be obvious to one of ordinary skill in the art, given the benefit of this disclosure. All variations of the invention that read upon appended claims are intended and contemplated to be within the scope of the invention. For instance, the exact design and configuration of the apparatus can vary dramatically from the illustrated embodiment utilizing different materials and mechanisms as best adapted for the materials and construction of the apparatus.

I claim:

1. A beverage bottle assembly comprising:
   a bottle, the bottle including a threaded opening at a top end;
   an spout being received over the threaded opening at a proximal end and having (i) an internal passageway extending from the proximal end to a distal end thereof and (ii) a resistance heater proximate and extending along at least a substantial portion of the internal passageway;
   a battery pack including one or more batteries; and
   a control circuit, the control circuit including (a) an on/off switch, (b) a recharge port and (c) circuitry to control the charging of the one or more batteries;
   wherein the resistance heater, the battery pack and the control circuit are operatively electrically connected.

2. The beverage bottle assembly of claim 1, wherein the bottle includes a handle.

3. The beverage bottle assembly of claim 1, wherein the bottle is insulated.

4. The beverage bottle assembly of claim 1, wherein the spout and the passageway are is elongated.

5. The beverage bottle assembly of claim 4, wherein the spout and the passageway are each at least 2 inches long.

6. The beverage bottle assembly of claim 4, the passageway is at least partially frustoconical from a widest diameter proximate the proximal end and narrowest diameter proximate the distal end.

7. The beverage bottle assembly of claim 1, wherein the resistance heater comprises a coiled wire.

8. The beverage bottle assembly of claim 7, wherein the coiled wire is encapsulated in the spout along at least a substantial portion of the passageway.

9. The beverage bottle assembly of claim 1, wherein the one or more batteries are rechargeable.

10. The beverage bottle assembly of claim 9, wherein the one or more batteries are either NiMH or LiION cells.

11. The beverage bottle assembly of claim 1, wherein the one or more batteries comprise six or more AA or AAA batteries.

12. The beverage bottle assembly of claim 1, wherein the control circuit further includes an LED lamp, the LED lamp configured to indicate when the heater is activated.

13. The beverage bottle assembly of claim 12, wherein the LED lamp is further configured to indicate the level of charge of the one or more batteries.

14. The beverage bottle assembly of claim 1, wherein the control circuit includes a timer to automatically turn off the heater after a predetermined period of time.

15. The beverage bottle assembly of claim 1, further comprising a temperature sensor, the temperature sensor being located near the distal end of the spout and being electrically coupled to the control circuit with the control circuit being further configured to control current flow to the heater to prevent the liquid temperature from exceeding a predetermined temperature as it exits the spout.

16. A beverage bottle assembly comprising:
a bottle, the bottle including a threaded opening at a top end;
an spout being received over the threaded opening at a proximal end and having (i) an internal passageway extending from the proximal end to a distal end thereof and (ii) a resistance heater proximate and extending along at least a substantial portion of the internal passageway;
a battery pack including one or more batteries; and
a control circuit, the control circuit including an on/off switch;
wherein the resistance heater, the battery pack and the control circuit are operatively electrically connected, and wherein the battery pack includes a shroud and is received on top of the bottle and around the proximal end of the spout.

17. The beverage bottle assembly of claim 16, wherein the control circuit is located within the shroud.

18. A beverage bottle assembly comprising:
a bottle, the bottle including a threaded opening at a top end;
an elongated spout being received over the threaded opening at a proximal end and having (i) an internal passageway at least 3" long extending from the proximal end to a distal end thereof, the passageway having a generally frustoconical shape over at least a portion thereof, and (ii) a resistance heater encapsulated in the spout extending along at least a substantial portion of the internal passageway, the resistance heater comprising a coiled wire;
a battery pack including a plurality of rechargeable batteries, and a battery shroud, the battery shroud being received on top of the bottle and around the proximal end of the spout; and
a control circuit, the control circuit including an on/off switch, a charging port and an LED lamp, and being located within the shroud;
wherein the resistance heater, the battery pack and the control circuit are operatively electrically connected.

19. The beverage bottle assembly of claim 18, further including a temperature sensor located near the distal end of the spout.

\* \* \* \* \*